United States Patent [19]
Brown et al.

[11] 3,731,775
[45] May 8, 1973

[54] CLUTCH SPRING RETAINER ASSEMBLY

[75] Inventors: Larry A. Brown; James W. McMichael, both of Peoria, Ill.

[73] Assignee: Caterpillar Tractor Co., Peoria, Ill.

[22] Filed: Oct. 21, 1971

[21] Appl. No.: 191,436

[52] U.S. Cl............192/89 R, 192/70.27, 29/470.3, 267/169
[51] Int. Cl...............................................F16d 13/44
[58] Field of Search ..............192/89 R, 89 A, 91 A, 192/90, 70.27, 115; 29/470.3; 267/169, 170, 178

[56] References Cited

UNITED STATES PATENTS 3,273,233  9/1966  Oberle et al.......................29/470.3
1,695,726  12/1928  Woolson............................267/169 X
2,439,611  4/1948  Nabstedt...........................192/89 A X
3,474,888  10/1969  Carlson............................192/91 A X

FOREIGN PATENTS OR APPLICATIONS 878,737  6/1953  Germany...............................267/178

Primary Examiner—Benjamin W. Wyche
Attorney—Stephen Westbrook et al.

[57] ABSTRACT

A spring retainer assembly for a vehicle steering clutch has stud members bonded to a plate by friction welds. Spring seat members are disposed on the stud members adjacent the plate and are retained by shoulders provided on the stud members. The ends of the stud members projecting from the plate are tapped to receive capscrews.

2 Claims, 4 Drawing Figures

Patented May 8, 1973 3,731,775

INVENTORS
LARRY A. BROWN
JAMES W. McMICHAEL

BY Fryer, Zenwald, Fix, Phillips & Lempio

ATTORNEYS

Patented May 8, 1973
3,731,775
2 Sheets-Sheet 2
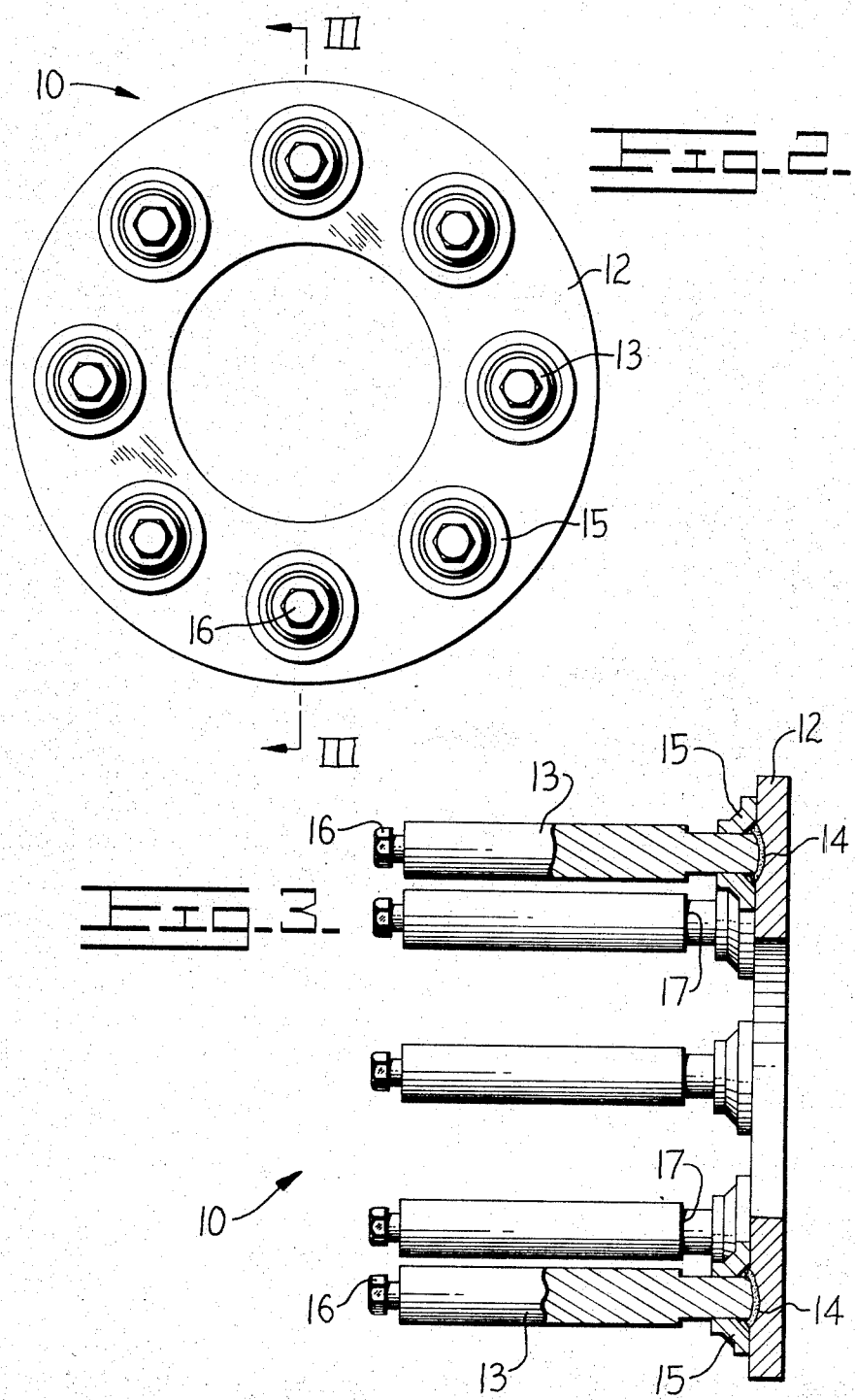
INVENTORS
LARRY A. BROWN
JAMES W. McMICHAEL
BY
ATTORNEYS 3,731,775

CLUTCH SPRING RETAINER ASSEMBLY

BACKGROUND OF THE INVENTION

Steering clutches commonly employed for steering crawler vehicles comprise multiple disc, oil-type clutches which are held in engagement by springs and which are disengaged hydraulically. The springs are disposed on studs which project from an annular retainer plate having spring seats formed thereon around the base of each stud. In a clutch assembly, the outer ends of the studs project through an inner drum and are attached to the clutch pressure plate. The springs, compressed between the inner drum and the retainer plate, retain the clutch in engagement until oil pressure is applied to a piston, moving it outward against the retainer plate, which moves the pressure plate out of contact with the clutch discs to disengage the clutch.

The spring retainer assembly typically comprises a forged annular retainer plate, including spring seats forged thereon which are drilled and tapped to receive long bolts. The long bolts serve to connect the pressure plate to the retainer plate and to retain the springs on spring seats provided on the retainer plate and inner drum.

While this spring retainer assembly construction functions properly in the clutch assembly, the forged plate with the spring seats formed thereon is expensive to manufacture. Furthermore, it is difficult to assemble the assembly since it must be done in conjunction with the assembly of the clutch, with the springs being retained between the retainer plate and the inner hub while the long bolts are inserted through holes in the pressure plate and the inner hub, through the centers of the springs, and screwed into the tapped holes in the forged spring seats on the retainer plate.

BRIEF DESCRIPTION OF THE INVENTION

This invention overcomes these disadvantages by providing a spring retainer assembly that is inexpensively manufactured from common plate and bar stock, and thus is significantly more economical to produce than present assemblies.

Furthermore, the spring retainer assembly of the present invention allows for greater ease of assembly than the prior retainer assemblies.

A clutch spring retainer assembly constructed in accordance with the present invention comprises a plurality of spring retaining stud members bonded by friction welds to an annular retainer plate. Annular spring seats are captured on the stud members between the plate and shoulders formed on the stud members. The outer ends of the stud members are drilled and tapped for attachment to a pressure plate by means of capscrews.

BRIEF DESCRIPTION OF THE DRAWINGS

FIG. 2 is an end view of the spring retainer assembly of the present invention;

FIG. 3 is a sectional view of the spring retainer assembly shown in FIG. 2 taken along the line III—III in FIG. 2; and, FIG. 4 is a fragmentary perspective view of a portion of a spring retainer assembly of the present invention.

DETAILED DESCRIPTION OF PREFERRED EMBODIMENT

Figure 1:
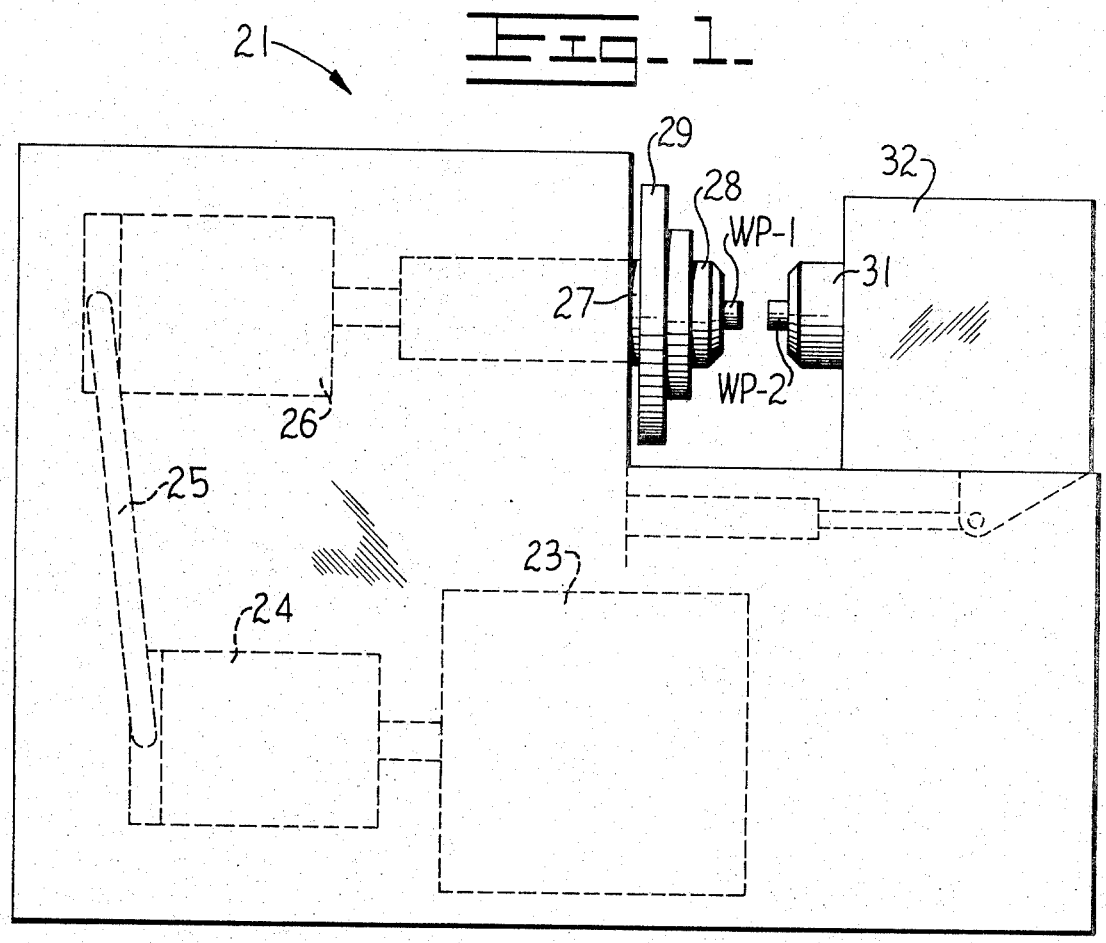
FIG. 1 is a side elevational view illustrating one embodiment of a friction welding machine that may be used to construct a spring retainer assembly in accordance with the present invention.

Referring to FIGS. 2 and 3, a clutch spring retainer assembly constructed in accordance with one embodiment of the present invention is indicated generally by the reference numeral 10. The assembly 10 comprises an annular retainer plate 12, a plurality of stud members 13 bonded to a face of the retainer plate by friction welds 14, annular spring seats 15 slidably disposed on each stud member at the bases thereof adjacent the retainer plate, and capscrews 16 threaded axially into an end of each stud member remote from the retainer plate. A shoulder 17 formed on each stud member retains each spring seat in close proximity to the plate.

The retainer plate 12 is an annular plate with flat faces and may be constructed from plain plate stock.

Similarly, the stud members 13 may be formed from plain bar stock.

Thus, the parts of the spring retainer assembly are relatively inexpensive and easy to fabricate in accordance with well-known manufacturing methods which will not be further described.

Referring now to FIG. 1, the assembly of the parts of the spring retainer assembly is performed by employing a friction welding machine, one exemplary embodiment of which is shown generally by the reference numeral 21. As shown, the machine comprises a frame or housing structure 22, which houses an electric motor 23 mechanically connected in driving engagement with a pump 24. The pump is connected by a manifold 25 to a hydraulic motor 26 which drives a spindle 27.

A chuck 28 is mounted on the spindle and the chuck and the spindle are mounted for rotation within the frame 22. The spindle is adapted to receive flywheels 29 which may be of various size and mass depending upon the application of the machine.

A non-rotating chuck 31 is mounted on a tailstock fixture 32, which in turn is mounted for axial movement on the machine frame 22. A pressure control circuit, not shown, regulates the pressures in the load cylinder, and thus determines the force with which workpieces WP-1 and WP-2 mounted in chucks 28 and 31 respectively, are engaged.

The drive ratio between the electric motor and the spindle can be varied by changing the cam angles in either the pump or the hydraulic motor, and the pump and the motor can be used to effectively disconnect the electric motor from the spindle by moving the cam in the pump to a position in which the pump does not displace any hydraulic fluid to the motor.

The flywheel weights are mounted on the spindle so that the welding machine can be operated as an inertia welding machine as described in U.S. Pat. No. 3,273,233 and as described in further detail below.

A welding operation to join a stud member to the retainer plate of the present invention can be performed in the following manner.

The retainer plate 12 is securely fastened in a fixture (not shown) which is in turn mounted in the non-rotating chuck 31 on the tailstock fixture 32.

A stud member 13 is then securely fastened in chuck 28 on the spindle of the welding machine. The projecting end of the stud member has been previously turned to provide a shoulder 17 thereon, and the opposite end has been drilled and tapped to accept capscrews 16 at a later time.

A spring seat 15 is then placed over the turned end of the stud member, and the retainer plate and tailstock fixture are advanced toward the projecting end of the stud member until the face of the retainer plate is in such close proximity to the end of the stud member that the spring seat is trapped on the stud member between the retainer plate and the shoulder 17 formed on the stud member.

The retainer plate is then indexed until the intended point of attachment of the stud member registers with the stud member.

The spindle and the stud member are then rotationally accelerated until they reach a predetermined welding velocity at which time power to the spindle is discontinued and the stud member and retainer plate are brought together under a large axial force. The energy stored in the rotating components is quickly converted to heat due to the friction between the rotating stud member and the non-rotating retainer plate; and, when the energy in the spindle has been entirely converted and rotation has ceased, the stud member becomes welded to the retainer plate.

The rotatable chuck 28 is then released and the tailstock fixture is retracted withdrawing the stud member from chuck 28.

If, as in the preferred embodiment shown, the clutch spring retainer assembly comprises eight stud members symmetrically attached to the retainer plate, the plate holding fixture and retainer plate are then indexed 45° and another stud member is inserted in chuck 28 and the foregoing process is repeated.

Figure 4:
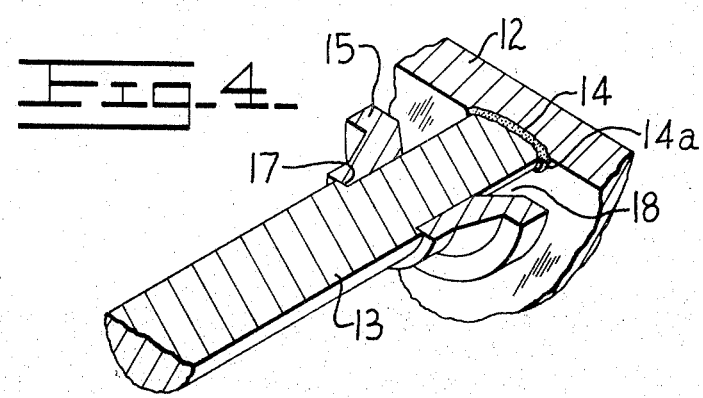

FIG. 4 illustrates in larger detail, the construction of a completed assembly of a stud member and a spring seat with the retainer plate. The stud member 13 is bonded to the retainer plate 12 by a friction weld 14 which has produced a weld flash 14a. The spring seat 15 is slidably disposed on the stud member and is free to slide thereon between the retainer plate 12 and the shoulder 17 on the stud member.

Of course it will be understood that at final assembly in the clutch, the spring seat will be forced into abutment with the face of the retainer plate and held there by the spring which is retained by the stud member 13. A chamfer 18 on the spring seat allows the spring seat to abut the retainer plate without interference with the weld flash 14a.

The shoulder 17 is provided on the stud member a sufficient distance from the face of the retainer plate to prevent the spring retainer from being welded to either the retainer plate or the stud member during the welding operation.

A clutch spring retainer assembly constructed in accordance with the present invention is less expensive to manufacture than the forged plate and long bolt assembly of the prior art constructions. It will also be appreciated by those skilled in the art that the spring retainer assembly of the present invention is easier to assemble with the other components of the steering clutch assembly than the prior art devices since the stud members are already assembled to the retainer plate and ready to receive the springs and the inner drum of the clutch assembly; and the short cap-screws may be easily inserted through the pressure plate and screwed into the ends of the stud members.

What is claimed is:

1. A spring retainer assembly for a clutch assembly, comprising
   a retainer plate,
   a plurality of stud members,
   friction welds joining said stud members to said retainer plate, and
   an annular spring seat disposed on each of said stud members adjacent said retainer plate,
   said spring seats having faces adapted for abutment with said retainer plate, said faces including a chamfer adjacent the stud members to allow abutment of said faces with said retainer plate without interference between the spring seats and any weld flash adjacent the friction welds.

2. A spring retainer assembly for a clutch comprising,
   an annular retainer plate,
   a plurality of parallel stud members disposed normal to said plate, said stud members having first ends adjacent said retainer plate and second ends remote from said retainer plate, said first ends having a first diameter and said second ends having a second diameter larger than said first diameter,
   a shoulder on each of said stud members separating said first ends from said second ends,
   means formed in said second ends to threadably receive capscrews in coaxial relation therewith,
   annular spring seats disposed on said first ends of said stud members and having inner diameters at least as great as said first end diameters but less than said second end diameters whereby said spring seats may slide on said stud members between said retainer plate and said shoulders,
   means providing chamfers on said spring seats at the inner diameter thereof and adjacent to said retainer plate, and,
   friction welds joining said stud members to said retainer plate.

* * * * *